United States Patent
Sarkisian et al.

(10) Patent No.: US 9,505,024 B2
(45) Date of Patent: Nov. 29, 2016

(54) METHOD OF PRODUCING A PRINTED IMAGE ON A PRE-TREATED, LOW-POROUS OR NON-POROUS MEDIUM

(75) Inventors: George Sarkisian, San Diego, CA (US); Ali Emamjomeh, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 13/329,794

(22) Filed: Dec. 19, 2011

(65) Prior Publication Data

US 2013/0156953 A1  Jun. 20, 2013

(51) Int. Cl.
| | |
|---|---|
| B05D 1/36 | (2006.01) |
| B41M 5/00 | (2006.01) |
| B05D 3/00 | (2006.01) |
| B05D 3/04 | (2006.01) |
| B05D 3/02 | (2006.01) |
| B05D 5/04 | (2006.01) |
| C08L 75/04 | (2006.01) |
| C08L 33/08 | (2006.01) |

(52) U.S. Cl.
CPC ......... *B05D 1/36* (2013.01); *B05D 3/002* (2013.01); *B05D 3/0263* (2013.01); *B05D 3/0413* (2013.01); *B05D 5/04* (2013.01); *B41M 5/00* (2013.01); *B41M 5/0011* (2013.01); *B41M 5/0017* (2013.01); *B41M 5/0047* (2013.01); *B41M 5/0064* (2013.01); *C08L 33/08* (2013.01); *C08L 75/04* (2013.01); *B05D 2201/02* (2013.01); *B05D 2350/60* (2013.01); *B05D 2401/20* (2013.01)

(58) Field of Classification Search
None
See application file for complete search history.

(56) References Cited

U.S. PATENT DOCUMENTS

| | | | |
|---|---|---|---|
| 5,886,071 | A | 3/1999 | Hariharan |
| 6,123,760 | A * | 9/2000 | Varnell ................... 106/174.1 |
| 6,786,588 | B2 * | 9/2004 | Koyano et al. ............ 347/100 |
| 6,908,185 | B2 | 6/2005 | Chen et al. |
| 7,335,699 | B2 | 2/2008 | Dziwok et al. |
| 7,563,842 | B2 | 7/2009 | Ma et al. |
| 7,572,326 | B2 | 8/2009 | Choy et al. |
| 7,677,714 | B2 | 3/2010 | Sarkisian et al. |
| 7,722,179 | B2 | 5/2010 | Mubarekyan et al. |
| 7,728,062 | B2 | 6/2010 | Ma et al. |
| 7,744,205 | B2 | 6/2010 | Sarkisian et al. |
| 2003/0018139 | A1 | 1/2003 | Williams et al. |
| 2003/0148047 | A1 | 8/2003 | Shepherd |
| 2006/0010619 | A1 | 1/2006 | Hees et al. |
| 2006/0057339 | A1 | 3/2006 | Adachi et al. |
| 2006/0147658 | A1 | 7/2006 | Olijve et al. |
| 2008/0041003 | A1 | 2/2008 | Nowak et al. |
| 2008/0057230 | A1 | 3/2008 | Read et al. |
| 2009/0191383 | A1 | 7/2009 | Kluge et al. |
| 2009/0219330 | A1 | 9/2009 | Kiyomoto et al. |
| 2009/0233065 | A1 | 9/2009 | Komatsu |
| 2010/0080910 | A1 | 4/2010 | Okada |
| 2010/0231671 | A1 | 9/2010 | Anton et al. |
| 2011/0032303 | A1 | 2/2011 | Li |
| 2011/0039115 | A1 | 2/2011 | Domes et al. |
| 2011/0200799 | A1 | 8/2011 | Mukai et al. |

FOREIGN PATENT DOCUMENTS

| | | | |
|---|---|---|---|
| JP | 2009-299240 A | * | 12/2009 |
| WO | WO 2008/052962 A1 | | 5/2008 |
| WO | WO 2011/021591 A1 | | 2/2011 |
| WO | WO 2012/170036 A1 | * | 12/2012 |
| WO | WO 2013/025210 A1 | * | 2/2013 |

OTHER PUBLICATIONS

Rheolate 255 information sheet, Copyright 2014 Elementis Specialties, Inc., 2 pages.*
International Search Report—4 pgs., Aug. 1, 2012, Hewlett-Packard Development Company, L.P. et al.

* cited by examiner

*Primary Examiner* — William Philip Fletcher, III
(74) *Attorney, Agent, or Firm* — Tarolli, Sundheim, Covell & Tummino L.L.P.

(57) ABSTRACT

A method of producing a printed image on a low-porous or non-porous medium. The method encompasses applying a pretreatment fluid including a liquid vehicle, at least one polymeric binder, and an associative thickener to the low-porous or non-porous medium; and applying an aqueous pigment ink composition to the pretreatment fluid applied to the low-porous or non-porous medium, wherein the pretreatment fluid has a viscosity of about 10 cps to about 1000 cps and a surface tension of about 16 dynes/cm to about 30 dynes/cm and the viscosity of the pretreatment fluid allows mixing of the pigment ink composition with the pretreatment fluid.

6 Claims, 2 Drawing Sheets

PolyStyrene, No Pretreatment Fluid

PolyStyrene, Pretreatment Fluid C

Pretreatment fluid A, No Thickener

Pretreatment Fluid B with Rheolate 666 AT

METHOD OF PRODUCING A PRINTED IMAGE ON A PRE-TREATED, LOW-POROUS OR NON-POROUS MEDIUM

BACKGROUND

Digital printing methods, such as inkjet printing with aqueous inks, can be used for the printing of solid surfaces and offer a number of potential benefits over other printing methods, such as transfer printing and screen printing. Aqueous inkjet inks are inherently safer than reactive UV inks and inks whose primary vehicle is a solvent. Inkjet printing furthermore allows visual effects such as tonal gradients that cannot be practically achieved with the other printing means for solid surfaces.

Both dyes and pigments have been used as colorants for inkjet inks and both have certain advantages. Pigment and disperse dye inks are advantageous because they tend to provide more water-fast and light-fast images than soluble dye inks. Aqueous pigment and disperse dye inks however do not readily adhere to solid media with low surface energies, such as solid plastic media, and when applied to solid plastic media can exhibit unsatisfactory durability, weatherability, and rubbing or scratch resistance.

Pretreatment fluids can be used to prime media before ink colorants are jetted on the media to provide bleed and coalescence control as well as improve adherence and durability. However, pretreatment fluids due not readily adhere to low-porous and non-porous media with low surface energies and can exhibit poor water and solvent durability that can be unsatisfactory for outdoor signage.

DETAILED DESCRIPTION

Figure 1A:
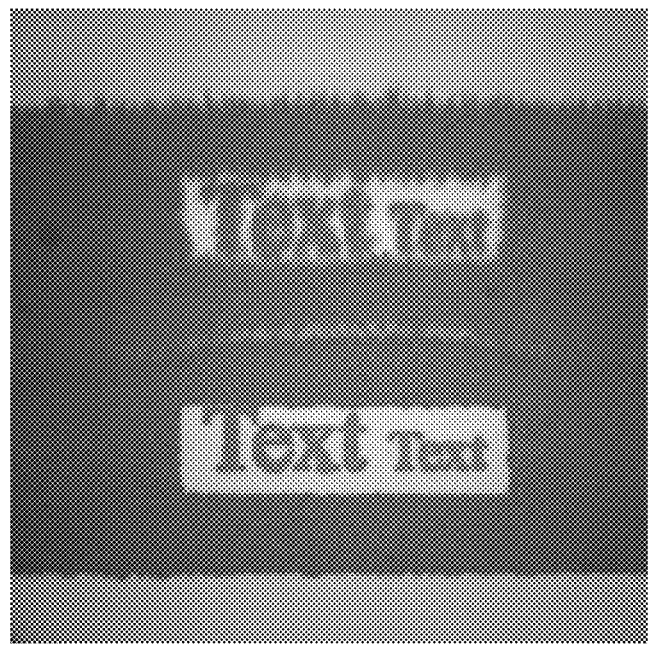
FIG. 1 illustrates images of comparing bleed control and coalescence control of printed films formed on polystyrene substrates printed with: (A) a pigment inkjet composition without prior application of a pretreatment fluid; and (B) a pigment inject composition after coating the substrate with a pretreatment fluid that includes an associative thickener.

Embodiments of this application relate to pretreatment fluids for a recording medium having a recording face formed of a low-porous or non-porous media, such as a low-porous or non-porous media that has a low surface energy (e.g., solid plastic media). The pretreatment fluid is applied on the low-porous or non-porous media prior to inkjet recording using a pigment ink composition. The pretreatment fluid readily adheres to the low-porous or non-porous media and when printed with a pigment ink composition, can prevent printed images from spreading and form a glossy, durable recorded matter possessing enhanced rubbing resistance, scratch resistance, and water fastness on a variety of substrates.

The inkjet pretreatment fluid includes a liquid vehicle, at least one polymeric binder, and an associative thickener. The polymeric binder can readily adhere to the low-porous or non-porous media and can act to bridge or anchor the pigment in the pigment ink composition to the substrate. The polymeric binder can also enhance the formation of a matrix on the low-porous or non-porous media, thereby facilitating adherence of pigments in the ink composition to the low-porous or non-porous media. In this aspect, the matrix can enhance the durability of an inkjet print on the low-porous or non-porous media.

In some embodiments, the polymeric binder can be selected from the group consisting of acrylic polymers, such as polystyrene-acrylic polymers, acrylic copolymers, such as styrene-(meth)acrylic acid copolymers, polyurethanes, salts thereof, and/or combinations thereof. Acrylic polymers, acrylic copolymers, polyurethanes, salts thereof, and/or combinations thereof can be water-soluble and readily adhere to low-porous and non-porous media, such as plastic media.

Examples of a water-soluble polymeric binder for use in the pretreatment fluid are water soluble salts of polyurethane, such as water amine salts of polyurethane. Water soluble amine salts of polyurethane are commercially available and may be selected from the BAYHYDROL series, manufactured by Bayer Material Science AG, Leverkusen, Germany. In one example, the Bayhydrol polyurethane can be BAYHYDROL UH 2606, which an aliphatic, amine salt of polyurethane, which readily adheres to plastic substrates, is weatherable and resistant to chemical degradation.

Other examples of water-soluble polymeric binders that can be used in the pretreatment fluid include salts of styrene-(meth)acrylic acid copolymers. A salt of a styrene-(meth) acrylic acid copolymer includes at least a styrene skeleton and a skeleton of the salt of the styrene-(meth)acrylic acid copolymer in its structure. It may also contain a skeleton derived from a monomer having another unsaturated group, such as a (meth)acrylate skeleton, in its structure. Examples of styrene-(meth)acrylic acid copolymers are commercially available and may be selected from the JONCRYL series (e.g., JONCRYL 538), manufactured by BASF, Corp. located in Florham Park, N.J.; SMA-1000Na and SMA-1440K, manufactured by Sartomer, located in Exton, Pa.; Disperbyk 190, manufactured by BYK Chemicals, located in Wallingford, Conn.; polystyrene-acrylic polymers manufactured by Gifu Shellac, located in Japan; or combinations thereof.

Other examples of polymeric binders include can be use in the pretreatment fluid include polyvinyl alcohol (including modified polyvinyl alcohols, such as carboxy-modified, itaconic-modified, maleic-modified, silica-modified or amino group-modified one), methylcellulose, carboxy methylcellulose, starches (including modified starches), gelatin, rubber Arabic, casein, a styrene-maleic anhydride copolymer hydrolysate, polyacrylamide and saponified vinyl acetate-acrylic acid copolymer. Other examples of polymeric binders include latex type thermoplastic resins of synthetic polymers, such as styrene-butadiene copolymer, vinyl acetate copolymer, acrylonitrile-butadiene copolymer, methyl acrylate-butadiene copolymer or polyvinylidene chloride.

Still other examples of the binders include thermoplastic polymers, such as polyolefins including polyethylene, polypropylene or polyvinyl chloride or mixtures thereof; polyamides and polyimides; polycarbonate, and polyesters, such as polyethylene terephthalate, known thermoplastic resins and latexes thereof, such as homopolymers made of a-methylene fatty acid monocarboxylic acid esters (e.g., methyl (meth)acrylate, ethyl(meth)acrylate, butyl(meth)acrylate, dodecyl(meth)acrylate, octyl(meth)acrylate or phenyl(meth) acrylate); styrenes, such as styrene, chlorostyrene or vinyl styrene; vinyl esters, such as vinyl acetate, vinyl propionate, vinyl succinate or vinyl butyrate; vinyl ethers, such as vinyl methyl ether, vinyl ethyl ether or vinyl butyl ether; or vinyl ketones, such as vinyl methyl ketone, vinyl hexyl ketone or vinyl isopropyl ketone, or copolymers containing the constitutional units.

Among above-illustrated examples, homopolymers of a-methylene fatty acid monocarboxylic acid esters, such as methyl(meth)acrylate, ethyl(meth)acrylate, butyl(meth)acrylate, dodecyl(meth)acrylate, octyl(meth)acrylate or phenyl(meth)acrylate or copolymers containing these constituent units are acrylic resins.

Examples of latex include latex of thermoplastic resin, such as acrylic latex, acrylic silicone latex, acrylic epoxy latex, acrylic styrene latex, acrylic urethane latex, styrene-butadiene latex, acrylonitrile-butadiene latex, polyester urethane latex, and vinyl acetate latex. Among these, a thermoplastic resin or mixture of thermoplastic resins, such a urethane resin and acrylic resin can be use where it is desirable to enhance the water-blocking properties.

In an embodiment, the pretreatment fluid can include at least one water-soluble polymeric binder in an amount ranging from about 1% by weight to about 50% by weight of the pretreatment fluid. In another embodiment, the pretreatment fluid can include about 1% by weight to about 20% by weight water-soluble salt of styrene acrylic and about 1% by weight to about 30% by weight water-soluble salt of polyurethane, for example, about 5% by weight to about 10% by weight water-soluble salt of styrene acrylic and about 10% by weight to about 20% by weight water-soluble salt of polyurethane.

The associative thickener can react with pigments in a pigment ink composition to provide substantially uniform distributions or networks of the pigments that can control bleed and mitigate ink or pigment migration when the pigment ink composition is applied or printed on a pretreatment fluid coated low-porous or non-porous media. The associative thickener can have a hydrophilic backbone and a plurality of hydrophobic groups attached to or within the backbone and acts or thickens via an associative mechanism. The hydrophilic groups can impart overall solubility to the associative thickener in a solvent, such as water. The hydrophobic groups of the associative thickener can associate with other hydrophobic groups on other thickener molecules prior to printing the pretreatment fluid with a pigment ink composition. Printing or applying a pigment ink composition, which includes hydrophobic pigment particles, on the pretreatment fluid allows the hydrophobic groups of the associative thickener to react or associate with the hydrophobic pigment particles and form a substantially uniform, evenly dispersed, and homogenous network of associative thickener and pigment particles. Although the associations in this network are dynamic, interaction lifetimes can be long enough and rapid enough to prevent pigment migration before the ink dries and inhibit bleed of the ink.

The associative mechanism requires a plurality of (i.e., two or more) hydrophobic groups on each hydrophilic backbone to participate in the network structure responsible forming a network with the pigments. In one embodiment, at least 2, in another embodiment at least 3, and yet another embodiment at least 4 of the hydrophobic groups are present per thickener molecule. These hydrophobic groups may be located within the backbone, pendant to the backbone and/or on chain termini.

In some embodiments, the hydrophobic groups can be chosen from radicals and polymeric groups comprising at least one hydrocarbon-based chain chosen from linear and branched, saturated and unsaturated hydrocarbon-based chains, which optionally comprise one or more hetero atom, such as P, O, N and S, and radicals comprising at least one chain chosen from perfluoro and silicone chains.

The hydrophilic backbone of the associative thickener can take a variety of forms, for example, the backbone can be linear, branched, or cross-linked. A variety of different types of backbones can be used, for example, a polyether, such as a polyoxyalkylene, a polyacrylamide, a polymethacrylamide, a polysaccharide, a polyvinyl alcohol, a polyvinyl alkyl ether, or a polyvinyl pyrrolidone. The polyacrylamide and polymethacrylamide may collectively be referred to as poly (meth)acrylamide. In one embodiment, the hydrophilic backbone comprises a (co)polymer comprising esters of acrylic acid or esters of methacrylic acid. The, acrylic acid and methacrylic acid may collectively be referred to as (meth)acrylic acid and the related esters may collectively be referred to as esters of (meth)acrylic acid, or as (meth) acrylates. Examples of suitable esters of (meth)acrylic acid include hydroxyethyl(meth)acrylate, that is, HEA or HEMA.

In another embodiment, a polyether associative thickener can be based on building blocks of polyoxyalkylene segments, for example polyethylene glycol building blocks. For example, the associative thickener may have a backbone comprising one or more polyoxyalkylene segments greater than 10 oxyalkylene units in length. As used herein, the term "oxyalkylene" refers to units having the structure —(O-A)-, wherein O-A represents the monomeric residue of the polymerization reaction product of a $C_{2-8}$ alkylene oxides. Examples of oxyalkylenes include, but are not limited to: oxyethylene with the structure —(OCH$_2$CH$_2$)—; oxypropylene with the structure —(OCH(CH$_3$)CH$_2$)—; oxytrimethylene with the structure —(OCH$_2$CH$_2$CH$_2$)—; and oxybutylene with the general structure —(OC$_4$H$_8$)—. Polymers containing these units are referred to as "polyoxyalkylenes." The polyoxyalkylene units can be homopolymeric or copolymeric. Examples of homopolymers of polyoxyalkylenes include, but are not limited to polyoxyethylene, which contains units of oxyethylene; polyoxypropylene, which contains units of oxypropylene; polyoxytrimethylene, which contains units of oxytrimethylene; and polyoxybutylene, which contains units of oxybutylene. Examples of polyoxybutylene include a homopolymer containing units of 1,2-oxybutylene, —(OCH(C$_2$H$_5$)CH$_2$)—; and polytetrahydrofuran, a homopolymer containing units of 1,4-oxybutylene, —(OCH$_2$CH$_2$CH$_2$CH$_2$)—.

Alternatively, the polyoxyalkylene segments can be copolymeric, containing two or more different oxyalkylene units. The different oxyalkylene units can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment.

In still another embodiment, polyoxyalkylene segments are linked with non-polyoxyalkylene segments or linkages. When the polyoxyalkylene units are linked with a multi-functional isocyanate, a hydrophobically ethoxylated urethane (HEUR) associative thickener is generated. HEUR associative thickeners can also contain urea linkages, ester linkages or ether linkages other than those linking the polyoxyalkylene units. The multi-functional isocyanates can be aliphatic, cycloaliphatic, or aromatic; and can be used singly or in admixture of two or more, including mixtures of isomers. Examples of organic polyisocyanates include 1,4- tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, 1,5-tetrahydronaphthylene diisocyanate, hexamethylene diisocyanate trimer, hexamethylene diisocyanate biuret, and triphenylmethane-4,4',4"-triisocyanate.

Examples of HEUR associative thickeners are RHEOLATE series associative thickeners (e.g., RHEOLATE 208, RHEOLATE 210, RHEOLATE 212, RHEOLATE 216, RHEOLATE 666, and RHEOLATE 678), which are commercially available from Elementis, Highstown, N.J., and ACRYSOL series associative thickeners (ACRYSOL RM-8w, ACRYSOL RM-500, a do ACRYSOL RM-895), which are commercially available Dow Chemical, Midland Mich.

In other embodiments, the associative thickener can be a hydrophobic ethoxylated aminoplast technology (HEAT) associative thickener. An example of a HEAT associative thickener is a water-soluble aminoplast ether copolymers of the following structural type:

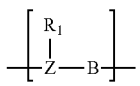

where Z is an aminoplast unit based on a glycoluril, which is unsubstituted or substituted by a reactive OR group (where R is an alkyl, alkylene, alkyl ether or alkyl ester group, such as a lower alkyl group, e.g., a methyl or ethyl group); B is the radical of an essentially water-insoluble polymer selected from poly-n-butyl acrylate, poly-n-butyl methacrylate, polyethyl acrylate, polytetrahydrofuran, polyethyl methacrylate, polymethyl acrylate, polymethyl methacrylate, a predominantly aliphatic polycarbonate or a predominantly aromatic polycarbonate, and a poly-n-butyl methacrylate or a predominantly aliphatic or aromatic polycarbonate having at least two functional groups, which are able to react with the OR function of the aminoplast unit, having a hydroxyl function; $R_1$ is the radical of a hydrophilic organic compound containing at least one functional group, which is able to react with the OR function of the aminoplast unit to form an ether bond, having a hydroxyl function, and a is at least 1. The molar ratio $R_1$:B can be greater than 1, for example greater than about 1.5 to 4.

Examples of HEAT associative thickeners are OPTIFLO series associative thickeners (e.g., OPTIFLO L1400, OPTIFLO H370 VF, OPTIFLO H600VF, OPTIFLO H3300VF, and OPTIFLO TVS-VF), which are commercially available from Southern Clay Products, Inc., Louisville.

Other examples of associative thickeners include hydrophobically modified alkali soluble polymers including hydrophobically modified alkali soluble emulsions (referred to herein as "HASE"), hydrophobically-modified celullosics, including hydrophobically-modified hydroxyethyl cellulose (referred to herein as "HMHEC"), hydrophobically modified poly(acrylamide). These associative thickeners can be used alone, in mixtures thereof, or in mixtures with HEUR associative thickeners and HEAT associative thickeners.

Advantageously, the associative thickener can be provided in the pretreatment fluid at amount effective to form a network with pigments of the ink composition and mitigate pigment migration upon printing of the pretreatment fluid. This amount can be such that the viscosity of the pretreatment fluid is maintained at a level effective to allow mixing of the ink composition with the pretreatment fluid. In an embodiment, the pretreatment fluid can include at least associative thickener in an amount ranging from about 0.1% by weight to about 2% by weight of the pretreatment fluid. In another embodiment, the pretreatment fluid can include about 0.1% by weight to about 1% by weight associative thickener.

The liquid vehicle can include a solvent in which the polymeric binder and associative thickener can be at least partially dissolved and which allows the polymeric binder and associative thickener to be evenly coated on the surface of a low-porous or non-porous media, such as a plastic media or substrate. The liquid vehicle can be aqueous or non-aqueous. An aqueous vehicle refers to a vehicle that includes water or a mixture of water and at least one water-soluble organic solvent (co-solvent). Selection of a liquid vehicle mixture depends on requirements of the specific application, such as desired surface tension and viscosity, the selected pigment ink composition, and compatibility with the media onto which the pretreatment fluid and pigment ink composition are applied.

Examples of water-soluble organic solvents include alcohols, ketones, keto-alcohols, ethers and others, such as thiodiglycol, sulfolane, 2-pyrrolidone, 1,3-dimethyl-2-imidazolidinone and caprolactam, glycols, triols such as glycerol and 1,2,6-hexanetriol; lower alkyl ethers of polyhydric alcohols, urea and substituted ureas. An aqueous vehicle can contain about 30% to about 95% water with the balance (e.g., about 70% to about 5%) being the water-soluble solvent.

In some embodiments the pretreatment fluid can include a long-chain alkyl glycol ether to enhance the wettability to film media. The long-chain alkyl glycol ether can include 5 to 8 alkyl chains, for example, 6 alkyl chains.

Examples of such a long-chain alkyl glycol ether include ethylene glycol mono-n-pentyl ether, ethylene glycol mono-iso-pentyl ether, ethylene glycol mononeopentyl ether, ethylene glycol mono-n-hexyl ether, ethylene glycol mono-iso-hexyl ether, diethylene glycol mono-n-pentyl ether, diethylene glycol mono-iso-pentyl ether, diethylene glycol mononeopentyl ether, diethylene glycol mono-n-hexyl ether, diethylene glycol mono-iso-hexyl ether, triethylene glycol mono-n-pentyl ether, triethylene glycol mono-iso-pentyl ether, triethylene glycol mononeopentyl ether, triethylene glycol mono-n-hexyl ether, triethylene glycol mono-iso-hexyl ether, propylene glycol mono-n-pentyl ether, propylene glycol mono-iso-pentyl ether, propylene glycol mononeopentyl ether, propylene glycol mono-n-hexyl ether, propylene glycol mono-iso-hexyl ether, dipropylene glycol mono-n-pentyl ether, dipropylene glycol mono-iso-pentyl ether, dipropylene glycol mononeopentyl ether, dipropylene glycol mono-n-hexyl ether, dipropylene glycol mono-iso-hexyl ether, tripropylene glycol mono-n-pentyl ether, tripropylene glycol mono-iso-pentyl ether, tripropylene glycol mononeopentyl ether, tripropylene glycol mono-n-hexyl ether, tripropylene glycol mono-iso-hexyl ether, diethylene glycol mono-2-ethylhexyl ether, triethylene glycol mono-2-ethylhexyl ether, and tetraethylene glycol mono-2-ethylhexyl ether. These glycol ethers may be used singly or in combination.

The glycol ether content in the pretreatment fluid can be about 0.1% by weight of the pretreatment fluid to about 15% by weight of the pretreatment fluid, for example, about 0.5% by weight to about 10% by weight or about 1% to about 5% by weight. If the long-chain alkyl glycol ether content is more than 15% by weight, the treatment liquid cannot easily dry when it is applied onto a low-porous or non-porous media.

In other embodiments, the pretreatment fluid can include a surfactant. The surfactant can be any surfactant that in combination with the other components of the pretreatment fluid lowers the surface tension of the pretreatment fluid to less than the surface tension or energy of the surface of the low-porous or non-porous media to be coated with the pretreatment fluid. For example, the pretreatment fluid can have a surface tension less than about 25 dynes/cm or less than about 20 dynes/cm.

The amount of surfactant can be from about 0.05% by weight to about 5% by weight of the pretreatment fluid, for example, about 0.25% by weight to about 2% by weight of the pretreatment fluid. The weight of the surfactant is the as received weight from the commercial supplier and may contain some organic solvent components and/or water. The weight is the total weight of the surfactant, which includes water and/or other solvents in the as received surfactant material.

It is believed that the surfactant facilitates even distribution of the pretreatment fluid on the low-porous or non-porous media. The even distribution leads to excellent color and optical density in the printed image; little if any bleed between the ink components; and sufficient adhesion for the printed image to be retained on the surface of the low-porous or non-porous media.

While any surfactant that meets the surface tension limitations can be chosen, in some embodiments the surfactant can be chosen from surfactants that have strong reduction of surface tension. Examples of these types of surfactants include fluorosurfactants and siloxane surfactants. Non-limiting examples of the fluorosurfactants include ZONYL Fluorosurfactants supplied by E.I. du Pont de Nemours and Company, Wilmington, Del., FLUORAD surfactants supplied by 3M Company, Minneapolis, Minn., and Dynax surfactants, supplied by Dynax Corp, Pound Ridge, N.Y.

Other examples of surfactants that have strong reduction in surface tension are siloxane surfactants. An alternate description of this type of surfactant is a siloxane surfactant. Examples of commercially available siloxane surfactants include BYKs and Silwets from BYK USA Inc., Wallingford, Conn. and Momentive Performance Materials, Wilton, Conn., respectively.

Another candidate class of surfactants includes sulfonated surfactants and nonionic surfactants. These include but are not limited to alkali metal and ammonium salts of ethoxylated alkyl sulfates; alkali metal salts and ammonium salts of alky sulfates, alkyl aryl sulfonates, alkylated benzene sulfonates; alkali metal and ammonium salts of ethoxylated straight chain primary and aliphatic secondary alcohols; amphoteric surfactants and nonionic surfactants such as ethoxylated alkylphenols, alkanol amides and amine oxides.

The pretreatment fluid may further contain other additives, such as a preservative, solubilizing agent, antioxidant, biocide, electric conductivity modifier, viscosity modifier, surface tension modifier, and oxygen absorbent. Examples of the preservative include sodium benzoate, sodium pentachlorophenol, sodium 2-pyridinethiol-1-oxide, sodium sorbate, sodium dehydroacetate, and 1,2-dibenzinethiazoline-3-one (Proxel CRL, Proxel BND, Proxel GXL, Proxel XL-2, and Proxel TN available from Arch Chemicals Inc., Atlanta, Ga.).

Examples of a solubilizing agent include alcohols, such as ethanol, propanol, and butanol; amines, such as diethanolamine and morpholine, and their modified products; inorganic hydroxides, such as potassium hydroxide, sodium hydroxide, and lithium hydroxide; ammonium hydroxide and quarternary ammonium hydroxides (for example, tetramethylammonium hydroxide); carbonates, such as potassium carbonate, sodium carbonate, and lithium carbonate, and their salts; ureas, such as N-methyl-2-pyrrolidone, 2-pyrrolidone, urea, thio urea, and tetramethyl urea; allophanates, such as allophanate and methyl allophanate; biurets, such as biuret, dimethyl biuret, and tetramethyl biuret; and L-ascorbic acid and its salts.

The pretreatment liquid of the embodiment may further contain an antioxidant, such as Tinuvins (328, 900, 1130, 384, 292, 123, 144, 622, 770, and 292), Irgacors (252 and 153), and Irganoxs (1010, 1076, 1035, and MD 1024) produced by CIBA Specialty Chemicals; and lanthanide oxide.

The pretreatment fluid may be prepared by mixing the above ingredients together in any order to dissolve (or disperse) them and if necessary removing impurities and the like by filtration. The viscosity of the pretreatment fluid should be such that the pretreatment fluid can be readily applied or coated on the low-porous or non-porous media and once applied readily mix with a pigment ink composition that is printed on the coated low-porous or non-porous media. In some embodiments, the pretreatment can have viscosity less than about 1000 cps, for example, less than about 900 cps, less than about 800 cps, less than about 700 cps, or less than about 600 cps.

The pretreatment fluid can be applied to or coated on a recording face of the low-porous or non-porous media. The low-porous or non-porous media can have a solid surface and include media that does not absorb, wick or is penetrated by substantial amounts of the pretreatment fluid or ink compositions described herein. Examples of low-porous and non-porous media include plastics, vinyl coated wall coatings, polymeric/plastic sheets, such as polyvinylbutyral, TYVEK, plastic sheets using, as a base material, polyethylene terephthalate, polycarbonate, polypropylene, polyethylene, polysulfone, ABS resin, and polyvinyl chloride, recording media prepared by coating a metal, for example, by vapor deposition, onto the surface of metals, such as brass, iron, aluminum, SUS, and copper, or non-metallic substrates, recording media prepared by subjecting paper as a substrate, for example, to water repellency-imparting treatment, recording media prepared by subjecting the surface of fibers, such as cloth, for example, to water repellency-imparting treatment, and recording media formed of ceramic materials, prepared by firing inorganic materials at a high temperature, metals, glass, stone, wood, brick, tile, transparencies and paper which is hydrophobic because it is either highly calendered and/or coated with hydrophilic coatings or paper, which has been processed for commercial offset printing. Included in the non-porous or low porous media includes media that would not absorb any of the pretreatment fluid or pigment ink composition.

In some embodiments the low-porous media or non-porous media has a low surface energy, such as surface energy less than 100 $mJ/m^2$, less than about 50 $mJ/m^2$, or about 20 $mJ/m^2$ to about 50 $mJ/m^2$. Examples of low-porous or non-porous media with a low surface tension can include polymeric or plastic films, polymeric or plastic sheets, and rigid plastic substrates, such as a rigid plastic substrate used in signage.

The pretreatment fluid may be applied or coated on the plastic media by any method without particular limitation. Examples of coating methods include brush coating, or contact-type coating using a conventional coating device, such as an air knife coater, a roll coater, a bar coater, a blade coater, a slide hopper coater, a gravure coater, a flexogravure coater, a curtain coater, an extrusion coater, a floating knife coater, a Komma coater, a die coater, gate roll coater, or a size press.

Other coating methods include and non-contact-type coating using a spray, an inkjet head, a jet nozzle or the like wherein the pretreatment fluid is applied by spraying on the recording face of the low-porous or non-porous media. Spraying can be limited to the printed area of the low-porous or non-porous media. An example of where this limited spraying would be particularly applicable is in the digital inkjet printing of an image on preformed plastic media article, such as outdoor signage.

After coating the pretreatment fluid on the low-porous or non-porous media and while the pretreatment fluid is still wet, a pigment ink composition is deposited or printed on the wet pretreatment fluid coated low-porous or non-porous media. In some embodiments, the pigment ink composition is deposited by an inkjet recording technique. An example of an inkjet recording technique includes drop-on-demand inkjet printing, which encompasses thermal and piezoelectric inkjet printing. Examples of printers include portable drop-on-demand inkjet printers (e.g., handheld printers, arm mountable printers, wrist mountable printers, etc.), desktop drop-on-demand inkjet printers, page wide array drop-on-demand printers/copiers, high-speed production printers, or combinations thereof.

Pigment ink compositions, such as pigment inkjet inks, that are deposited or printed on the coated low-porous or non-porous media can include a pigment that is dissolved or dispersed in ink vehicle. In one example, the pigments are not self-dispersing, and a dispersing aid may be added to the vehicle. In another example, the pigment may be self-dispersible and modified to include at least one polymer chemically attached thereto. The use of self-dispersed pigments comprising a pigment having a dispersant polymer physically attached or chemically tethered thereto can provide good results with respect to dry time and durability. Examples of such physical attachment or chemical tethering can be through hydrophobic-hydrophilic attraction, ionic association, covalent bonding, physical adsorption, or other attachment mechanisms.

The pigment can be of any color, and the embodiments described herein are not limited to specific pigments. Further, the pigments can be neutral, cationic, anionic, and/or hydrophobic.

The ink vehicle comprises the balance of the pigment ink composition and can include a solution or dispersion in which the pigments are dispersed or dissolved. Examples of components for the ink vehicle include polymers, surfactants, solvents, co-solvents, buffers, biocides, sequestering agents, viscosity modifiers, surface-active agents, chelating agents, resins, and/or water, and/or combinations thereof.

Examples of solvents for the ink vehicle include glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, Dantocol DHE, Lonza, Inc., Fairlawn, N.J., and/or combinations thereof.

The amount and type of solvent used depends, at least in part, on the desirable properties of the ink as well as the liquid vehicle of the pretreatment fluid. As such, the amounts may vary as desired.

The surfactants for the ink vehicle can be nonionic or anionic. Examples of nonionic surfactants include to ethoxylated alcohols, fluorinated surfactants, 2-diglycol surfactants, and/or combinations thereof. Specific examples of nonionic surfactants include surfactants from the SURFYNOL series, manufactured by Air Products and Chemicals, Inc., Allentown, Pa., in addition to the surfactants described herein with respect to the pretreatment fluid.

Polymers for the ink vehicle can be water-soluble, and may be selected salts of styrene-(meth)acrylic acid copolymers, polystyrene-acrylic polymers, polyurethanes, and/or other water-soluble polymeric binders, and/or combinations thereof. Examples of polyurethanes include those that are commercially available from Dainippon Ink & Chem, Inc. (DIC), located in Osaka, Japan. Other examples of polymers that can be used in the pigment ink composition are salts of styrene-(meth)acrylic acid copolymers. Examples of styrene-(meth)acrylic acid copolymers are commercially available and may be selected from the Joncryl series (e.g., Joncryl 586 and 683), manufactured by BASF, Corp. located in Florham Park, N.J.; SMA-1000Na and SMA-1440K, manufactured by Sartomer, located in Exton, Pa.; Disperbyk 190, manufactured by BYK USA Inc., located in Wallingford, Conn.; polystyrene-acrylic polymers manufactured by Gifu Shellac, located in Japan; or combinations thereof.

Printing or applying the pigment ink composition on or to the wet pretreatment fluid results in a film that includes a mixture of ink pigments and associative thickeners. The hydrophobic ends of the associative thickener can react with or associate with pigments to form substantially uniform, evenly dispersed, and homogenous network of associative thickener and pigment particles. This network strengthens the internal structure of the printed film and can result in a smoother and thicker printed film that exhibits enhanced gloss and durability compared printed film that is formed by printing an ink composition on a pretreatment fluid that does not include an associative thickener described herein. The reaction of the associative thickener and the pigments in the ink composition is also rapid enough to prevent pigment migration before the ink dries and inhibit bleed of the ink.

The printed ink film formed from the mixture of pretreatment fluid and pigment ink composition can be dried using heat drying means, for example, a heating device such as an infrared heating device or a hot air heating device. Drying treatment in the drying step can be carried out by heating with a heater or hot-air drying at a temperature of, for example, about 50° C. to about 65° C.

Upon drying the printed ink film of the ink composition and pretreatment fluid has enhanced adherence to the low-porous or non-porous media. The enhanced adhesion can substantially prevent the separation of the film caused, for example, by external force, such as friction or the entry of water into the interface and thus can realize the formation of recorded matters possessing excellent durability including rubbing resistance, scratch resistance and water resistance.

Embodiments described herein also relate to a method for inkjet printing fast-drying durable images with enhanced bleed control and durability. Such a method can comprise the step of at least partially coating low-porous or non-porous media, such as plastic media, with a pretreatment fluid described herein and then while the pretreatment fluid is still wet applying by, for example, inkjet printing, a pigment ink composition to the pretreatment fluid coated low-porous or non-porous media to from a mixture pigment ink compositions and pretreatment fluid. The mixture so formed can be dried by, for example, hot air drying to provide a durable, high resolution printed matter.

In another embodiment, an inkjet printed image on a low-porous or non-porous media can include a media substrate and a printed film formed from a pretreatment fluid and a pigment ink composition described herein. The pretreatment fluid can be applied to the low-porous or non-porous media and the pigment ink composition can upon printing mix with the pretreatment fluid to form the printed film. The combination of the pigment ink composition and the pretreatment fluid on the low-porous or non-porous media can provide a fast-drying durable image.

Embodiments of this application are further illustrated by the following Examples that are not intended to limit the application.

EXAMPLE 1

Pretreatment fluids were prepared using different formulations to test for bleed and coalescence control. The formulations and physical properties of the pretreatment fluids are listed in Table 1. Pretreatment fluid A was prepared as a control and did not include an associative thickener; whereas pretreatment fluids B, C, D, E, and F included either a HEAT associative thickener (Optiflo H370, Southern Clay Products, Louisville, Ky.) or a HEUR associative thickener (Rheolate 666, Elementis Specialties, Inc., Highstown, N.J.).

prepared using a pretreatment fluid with an associative thickener (i.e., pretreatment fluids B-E) exhibited improved bleed and coalescence control compared to a control pretreatment fluid that did not include an associative thickener.

Figure 1B:
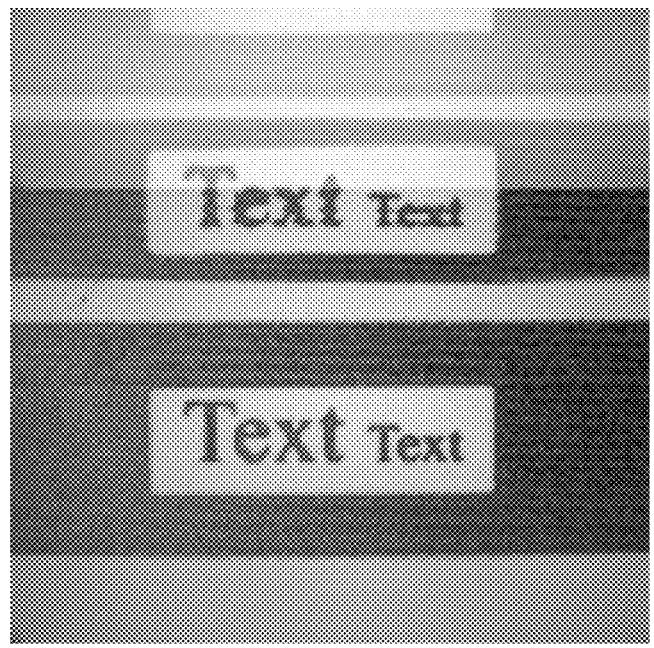

FIG. 1 illustrates images comparing bleed control and coalescence control of printed films formed on polystyrene substrates printed (A) a pigment inkjet composition without prior application of a pretreatment fluid; and (B) a pigment inkjet composition after coating the substrate with a pretreatment fluid, which includes a HEAT associative thickener and has the formulation C noted above. The images show the printed film (B) formed by inkjet printing the pigment ink composition over a wet pretreatment fluid coated polystyrene substrate exhibited enhanced resolution and bleed control compared to the printed film (A) formed by inkjet printing the pigment inkjet composition without prior application of a pretreatment fluid.

Figure 2A:
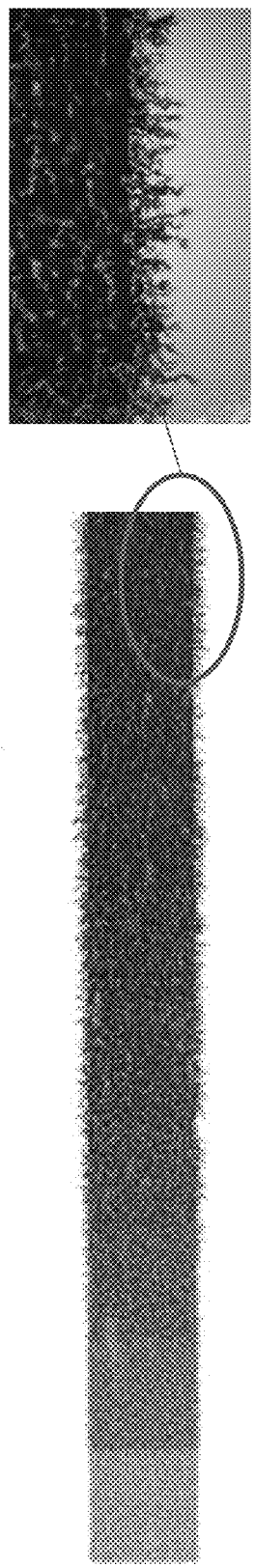
FIG. 2 illustrates images comparing bleed control and coalescence control of printed films formed on plastic substrates printed with: (A) a pigment inkjet composition after coating the substrate with a pretreatment fluid that is free of an associative thickener; and (B) a pigment inject composition after coating the substrate with a pretreatment fluid that includes an associative thickener.
Figure 2B:
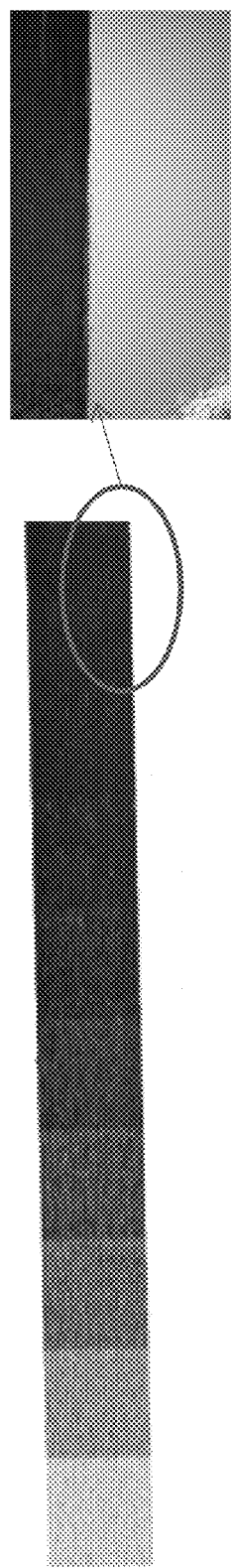

FIG. 2 illustrates images comparing bleed control and coalescence control of duty patterns formed on plastic substrates printed with: (A) a pigment inkjet composition after coating the substrate with a pretreatment fluid that is free of an associative thickener having the formulation A noted above (i.e., control formulation); and (B) a pigment inject composition after coating the substrate with a pretreatment fluid that includes a HEUR associative thickener and has the formulation B noted above. The images show the printed film (B) formed by inkjet printing the pigment ink composition over a wet pretreatment fluid that included an associative thickener exhibited enhanced resolution and

|  | Control Example-Poor Bleed | Formula Examples with good to excellent bleed control | | | | |
| --- | --- | --- | --- | --- | --- | --- |
| Ingredients | A | B | C | D | E | F |
| PROGLYDE DMM | 3.0 | 3.0 | 3.0 | 3.0 | 3.0 | 3.0 |
| DOWANOL DPM | 2.0 | 2.0 | 2.0 | 2.0 | 2.0 | 2.0 |
| BYK-021 | 0.2 | 0.2 | 0.2 | 0.5 | 0.5 | 0.2 |
| DYNAX DX4000 | 0.9 | 0.9 | 0.9 | 0.9 | 0.9 | 0.9 |
| JONCRYL 538-A | 5.0 | 5.0 | 5.0 | 5.0 | 9.5 | 7.0 |
| BAYHYDROL UH 2606 | 10.0 | 10.0 | 10.0 | 10.0 | 19.0 | 15.0 |
| Tecylen F-16/50 wax | 4.0 | 4.0 | 4.0 | 4.0 | 4.0 | 4.0 |
| BYK-348* | 0.5 | 0.0 | 0.0 | 0.0 | 0.0 | 0.0 |
| RHEOLATE 666 | 0.0 | 0.6 | 0.0 | 1.4 | 0.0 | 0.0 |
| OPTIFLO H370 | 0.0 | 0.0 | 0.6 | 0.0 | 0.8 | 0.6 |
| RAYCRYL 1240 | 0.0 | 0.0 | 10.0 | 0.0 | 0.0 | 0.0 |
| Water | Balance | Balance | Balance | Balance | Balance | Balance |
| Viscosity, cps | 14 | 156 | 37 | 768 | 434 | 234 |
| Surface Tension, d/cm | 20.83 | 19.61 | 21.81 | 21.61 | 23.13 | 19.05 |
| pH | 8.30 | 8.27 | 8.20 | 8.19 | 8.21 | 8.08 |

*Note:
BYK-348 does not affect bleed or surface tension when a strong fluorosurfactant is used (DX4000).
PROGLYDE DMM (dipropylene glycol dimethyl ether), Dow Chemical, Midland, MI.
DOWANOL DPM (dipropylene glycol methyl ether) Dow Chemical, Midland, MI.
BYK-021 (silicone defoamer), BYK USA Inc., Wallingford CT.
BYK-348 (silicone defoamer), BYK USA Inc., Wallingford CT.
DYNAX DX4000 (fluorosurfactant), Dynak Corporation, Pound Ridge, NY.
JONCRYL 538-A (styrene acrylic polymer), BASF Corporation, Florham, NJ.
BAYHYDROL UH 2606 (aliphatic, anionic urethane polymer), Bayer Material Science AG, Leverkusen, DE.
Tecylen F-16/50 wax (Lubricant), Trüb Emulsions Chemie, Ramsen, DE.
OPTIFLO H370 VF (HEAT associative thickener), Southern Clay Products, Louisville, KY.
PROXEL GXL (biocide), Arch Chemicals, Inc. Atlanta, GA.
RAYCRYL 1240- (acrylic), Specialty Polymers, Inc., Woodborn, OR.
RHEOLATE 666 (HEUR associative thickener), Elementis Specialties, Inc., Highstown, NJ.

Pretreatment fluids A-F were coated on a polystyrene substrate by roll coating the fluids on the substrates and then printed with a pigment aqueous inkjet composition and then dried in a thermostatic chamber kept at a temperature of about 50 C to form a printed film. All printed films that were bleed control compared to the printed film (A) formed by inkjet printing the pigment inkjet composition over a pretreatment fluid that did not include an associative thickener.

While several embodiments have been described in detail, it will be apparent that the disclosed embodiments can be modified. Therefore, the foregoing description is considered exemplary rather than limiting.

What is claimed is:

1. A method of producing a printed image on a recording medium, the method comprising:
   applying to the recording medium a pretreatment fluid, the pretreatment fluid comprising a liquid vehicle, at least one polymeric binder that adheres to the medium, the at least one polymeric binder selected from the group consisting of acrylic polymers, acrylic copolymers, polyurethanes, salts thereof, and/or combinations thereof, and an associative thickener, wherein the pretreatment fluid has a viscosity of about 10 cps to about 1000 cps and a surface tension of less than about 20 dynes/cm, and
   applying an aqueous pigment ink composition to the pretreatment fluid applied to the recording medium, the pretreatment fluid having a viscosity that allows mixing of the pigment ink composition with the pretreatment fluid.

2. The method of claim 1, further comprising drying the pigment composition applied to the pretreatment fluid.

3. The method of claim 1, the pigment ink composition being applied by inkjet printing.

4. The method of claim 1, the pretreatment fluid comprising an aqueous vehicle, about 1% by weight to about 50% by weight of the pretreatment fluid a polymeric binder, and about 0.1% to about 2% by weight of the pretreatment fluid an associative thickener.

5. The method of claim 4, the associative thickener being selected from the group consisting of a hydrophobically ethoxylated urethane (HEUR) associative thickener, a hydrophobically ethoxylated aminoplast (HEAT) associative thickener, a hydrophobically modified alkali soluble emulsions (HASE) associative thickener, a hydrophobically modified hydroxyethyl cellulose (HMHEC) associative thickener, and mixtures thereof.

6. The method of claim 1, the recording medium comprising a plastic medium.

* * * * *